United States Patent
Lehman et al.

(10) Patent No.: US 10,863,683 B1
(45) Date of Patent: Dec. 15, 2020

(54) INSULATED HOUSING HAVING A CONTROLLABLE INTERIOR ENVIRONMENT

(71) Applicants: Filomena Lori Lehman, Lake Worth, FL (US); Estelle Y. Stambaugh, Cape Coral, FL (US); Americo J. Rosato, Cape Coral, FL (US)

(72) Inventors: Filomena Lori Lehman, Lake Worth, FL (US); Estelle Y. Stambaugh, Cape Coral, FL (US); Americo J. Rosato, Cape Coral, FL (US)

( * ) Notice: Subject to any disclaimer, the term of this patent is extended or adjusted under 35 U.S.C. 154(b) by 114 days.

(21) Appl. No.: 15/986,151

(22) Filed: May 22, 2018

Related U.S. Application Data

(63) Continuation of application No. 15/175,252, filed on Jun. 7, 2016, now Pat. No. 9,974,253, which is a continuation of application No. 14/851,279, filed on Sep. 11, 2015, now Pat. No. 9,357,718.

(60) Provisional application No. 61/619,206, filed on Apr. 2, 2012.

(51) Int. Cl.
| | |
|---|---|
| *A01G 31/06* | (2006.01) |
| *A01G 7/04* | (2006.01) |
| *A01G 9/24* | (2006.01) |
| *A01G 9/20* | (2006.01) |
| *A01G 31/00* | (2018.01) |
| *A01G 31/02* | (2006.01) |

(52) U.S. Cl.
CPC ............ *A01G 31/06* (2013.01); *A01G 7/045* (2013.01); *A01G 9/20* (2013.01); *A01G 9/24* (2013.01); *A01G 31/00* (2013.01); *A01G 31/02* (2013.01); *Y02A 40/25* (2018.01); *Y02P 60/21* (2015.11)

(58) Field of Classification Search
CPC .... A01G 2009/1461; A01G 2009/1453; A01G 9/227; A01N 59/06; A01N 65/00
USPC .................................................. 47/17, 60, 65
See application file for complete search history.

(56) References Cited

U.S. PATENT DOCUMENTS

| | | | | |
|---|---|---|---|---|
| 2,928,211 | A * | 3/1960 | Martin | A01G 31/06 47/60 |
| 2,952,096 | A * | 9/1960 | Hughes | A01G 31/06 47/60 |
| 3,458,951 | A * | 8/1969 | Martin | A01G 31/06 47/60 |
| 4,068,405 | A * | 1/1978 | Campbell | A01G 31/045 47/65 |
| 4,163,342 | A * | 8/1979 | Fogg | A01G 7/045 47/58.1 R |
| 5,101,593 | A * | 4/1992 | Bhatt | A01G 9/16 47/17 |
| 5,315,834 | A * | 5/1994 | Garunts | A61L 9/00 62/78 |
| 5,493,808 | A * | 2/1996 | Munday | A01G 9/246 47/60 |
| 6,141,902 | A * | 11/2000 | Boice | A01G 9/16 47/17 |

(Continued)

*Primary Examiner* — Kristen C Hayes
(74) *Attorney, Agent, or Firm* — Mark D. Bowen; Malin Haley DiMaggio & Bowen, P.A.

(57) ABSTRACT

A shell with a controllable indoor climate. The shell may house plants, such as produce, for farming purposes. The shell may be made of scalable structurally insulated panels. Within the shell may be trays for facilitating the growth of the plants. Lighting, climate, and nutrients may be controlled for the proper growth of the plants.

3 Claims, 4 Drawing Sheets

(56) References Cited

U.S. PATENT DOCUMENTS

| | | | | |
|---|---|---|---|---|
| 7,278,237 | B2* | 10/2007 | Okabe | A01G 9/16 47/60 |
| 7,975,429 | B2* | 7/2011 | Okabe | A01G 7/02 47/61 |
| 8,234,812 | B1* | 8/2012 | Colless | A01G 9/16 47/61 |
| 8,910,419 | B1* | 12/2014 | Oberst | A01G 31/06 47/60 |
| 2004/0118038 | A1* | 6/2004 | Hilel | A01G 9/16 47/17 |
| 2011/0302838 | A1* | 12/2011 | Chen | A01G 7/045 47/65.9 |
| 2013/0152462 | A1* | 6/2013 | Wang | A01G 9/14 47/17 |

* cited by examiner

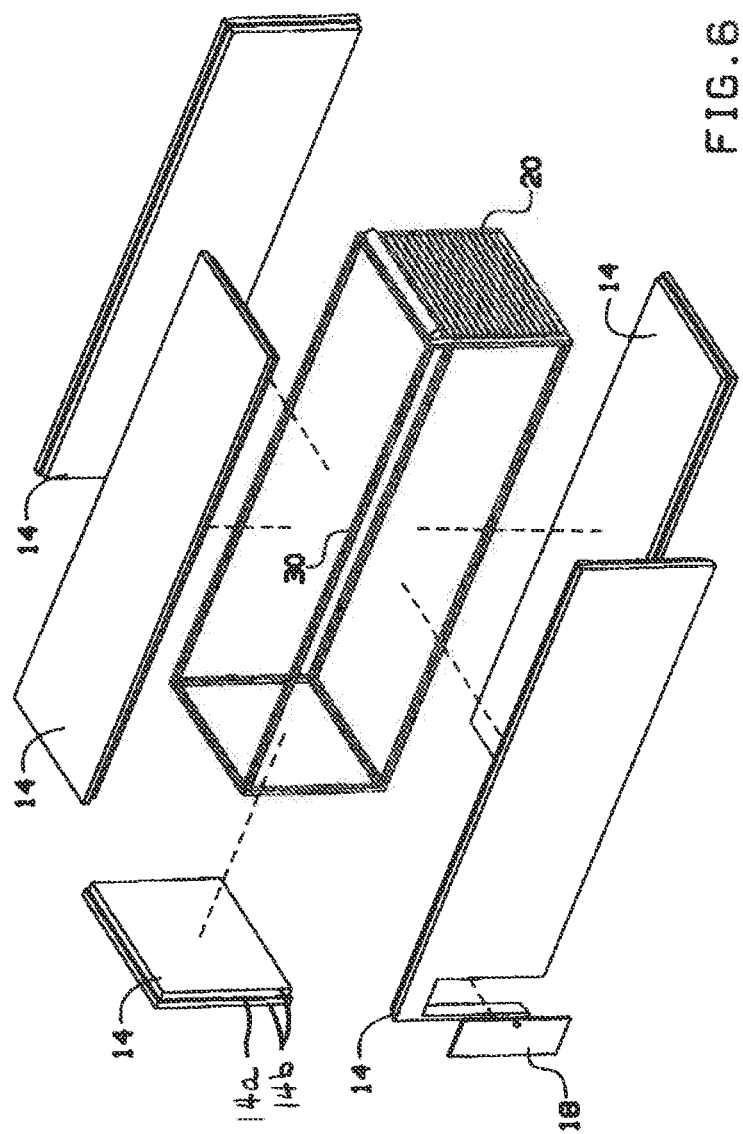

INSULATED HOUSING HAVING A CONTROLLABLE INTERIOR ENVIRONMENT

CROSS REFERENCE TO RELATED APPLICATIONS

This application is a continuation of U.S. patent application Ser. No. 15/175,252, filed on Jun. 7, 2016, which is a continuation of U.S. patent application Ser. No. 14/851,279, filed on Sep. 11, 2015, now U.S. Pat. No. 9,357,718, which is a continuation of U.S. patent application Ser. No. 13/854,650, filed on Apr. 1, 2013, which claims the benefit of provisional U.S. Patent application Ser. No. 61/619,206, filed on Apr. 2, 2012.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

The present invention relates to an indoor farming device and method and, more particularly, to an indoor farming device that may include a shell for facilitating plant growth within.

Nutrient rich farms are becoming scarce, are contaminated by chemicals, and are plagued with environmental issues. Meanwhile, the demand for food is becoming greater every year. In addition, genetically modified organisms (GMO) are becoming more and more common and the organic farmers will soon be forced to change their growing techniques to avoid cross contamination and thereby maintain their organic certifications.

Current practices include produce traveling on an average of 2,000 miles before reaching a grocery store. Further, the produce may be days to weeks old by then, and may lose most of its nutritional value. This may greatly increase the risk of disease, contamination and making the use of preservatives mandatory to extend shelf life. Today's food shortages, droughts, water shortages and global climate change, along with world population growth, have compromised our food production supply. Experts are actively concerned as organizations are struggling to find alternative ways to produce local food, which would eliminate major travel time, save fuel, and eliminate high water crop consumption.

A majority of hydroponics farming systems use greenhouse environments and control systems. Although those systems are effective they take up a lot of land, are not insulated to be used in extreme hot or cold climates, and are difficult to control the environment.

As can be seen, there is a need for a plant facilitation device that allows users to grow plants in a controlled environment.

BRIEF SUMMARY OF THE INVENTION

In one aspect of the present invention, a housing for the facilitation of plant growth comprises: a shell comprising a plurality of walls comprising a front, a back, a top, a bottom, a first side and a second side, wherein the plurality of walls comprises a plurality of structural insulated panels; at least one tray within the shell, wherein the tray is configured to contain plants; at least one lighting fixture within the shell oriented to project light onto the at least one tray; and at least one door attached to at least one of the plurality of walls to facilitate entry to an inside of the shell.

In another aspect of the present invention, a method of using a housing for the facilitation of plant growth comprises: placing at least one plant, nutrients and water into the at least one tray; placing the at least one tray onto the at least one cartridge; inserting the at least one cartridge into the shell through the at least one door; and situating the light fixture over the plant.

These and other features, aspects and advantages of the present invention will become better understood with reference to the following drawings, description and claims.

BRIEF DESCRIPTION OF THE SEVERAL VIEWS OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 6 is an exploded view of the shell of FIG. 1.

DETAILED DESCRIPTION OF THE INVENTION

Figure 1:
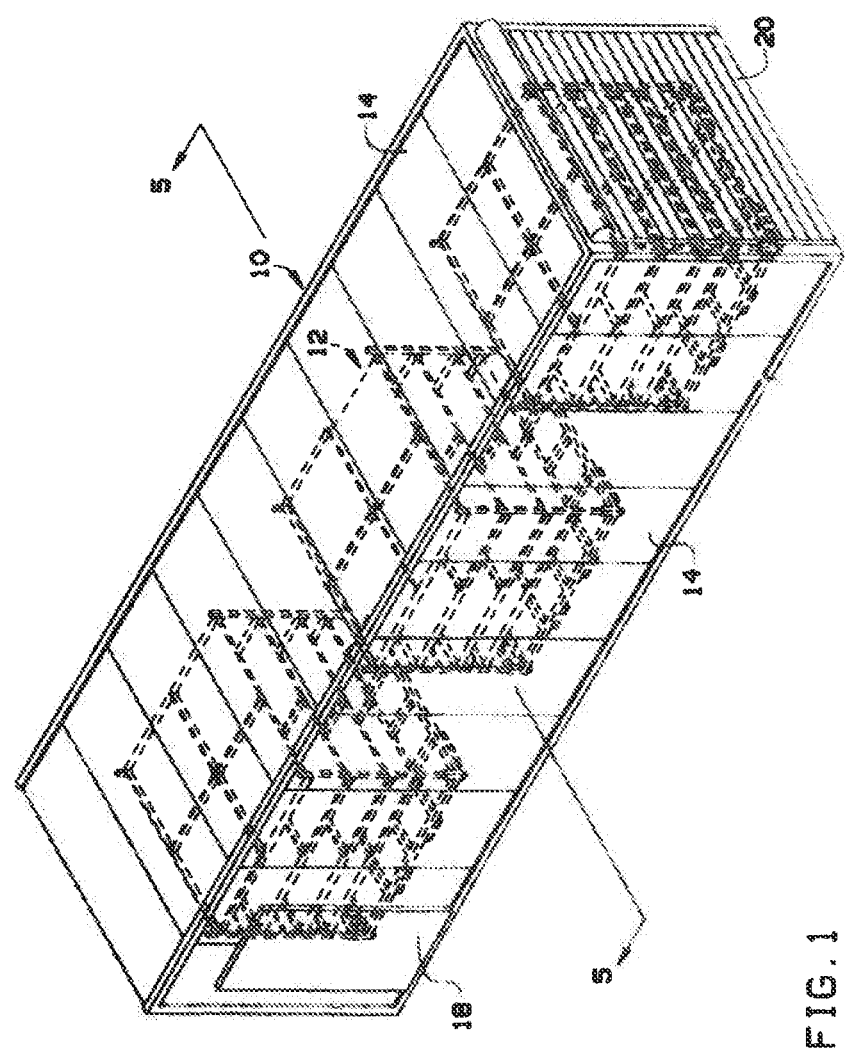
FIG. 1 is a perspective overview of an embodiment of the present invention.

The terms used in this specification generally have their ordinary meanings in the art, within the context of the invention, and in the specific context where each term is used, Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control. As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated. As used herein, when a number or a range is recited, ordinary skill in the art understand it intends to encompass an appropriate, reasonable range for the particular field related to the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a shell with a controllable indoor climate. The shell may house plants, such as produce, for farming purposes. The shell may be made of structural insulated panels. Within the shell may be trays for facilitating the growth of the plants. Lighting, climate, and nutrients may be controlled for the proper growth of the plants.

The present invention may include a scalable farming solution, which may include a structurally insulated controlled growing environment with digitally controlled hydroponics vertical cartridge system. The present invention provides a turn-key vertical farming solution that may help provide produce commercially and independently in food deserts. The present invention may use 85% less water, 95% less fossil fuels, and does not need pesticides or fertilizers.

In certain embodiments, the present invention may implement structural insulated panels (SIP) to accurately control the farming environment. Additionally, combining vertical farming systems and a scalable farming approach, the present invention may be customized for farmers' needs. The present invention may produce crops all year around, cut harvest times in half and provide 20 to 30 times more than traditional greenhouse farming methods.

Referring to FIGS. 1 through 6, the present invention may include a shell 10. The shell 10 may include multiple walls including a front, a back, a top, a bottom, a first side and a second side. The walls may be supported by a frame 30. The walls may be made of panels 14, such as structural insulated panels (SIPs). Integrated within the panels 14 may include electrical outlets and conduits.

The SIPs may be made of building material and may consist of an insulating layer of polymer foam 14a sandwiched between two layers of structural board 14b. The board may be made of, thermoplastic substrate laminate, sheet metal, cement, oriented strand board or the like. The thermoplastic substrate laminate may be made from continuous by-directional fiberglass reinforced polypropylene resin. The foam may include expanded polystyrene foam, extruded polystyrene foam, polyisocyanurate foam, polyurethane foam or the like. As illustrated in FIG. 6, each wall may include one panel 14. However, as illustrated in FIG. 1, each wall may be constructed of a plurality of panels 14.

In certain embodiments, the shell 10 of the present invention may include at least one door that may be opened and closed to gain access to the inside of the shell 10. For example, the shell 10 may include a door 18 on the first side, second side, front and/or back. In certain embodiments, the shell 10 may include a roll-up door 20 on the front or back. The roll-up door 20 may be used to easily insert and remove equipment from the inside of the shell 10.

Figure 2:
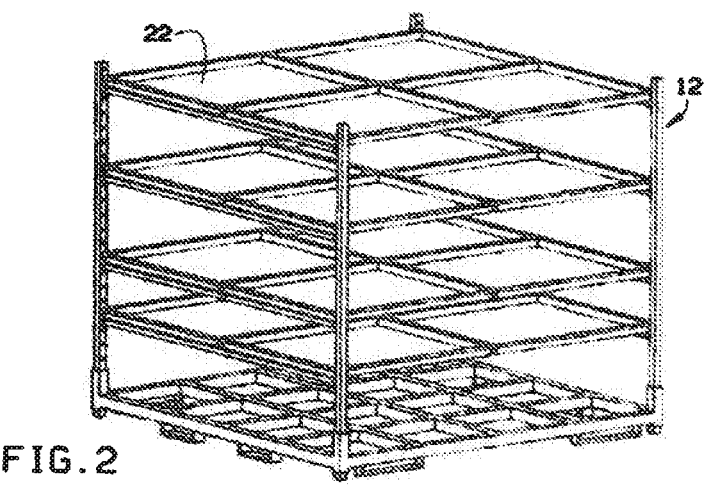
FIG. 2 is a perspective view of a cartridge illustrated with trays.
Figure 3:
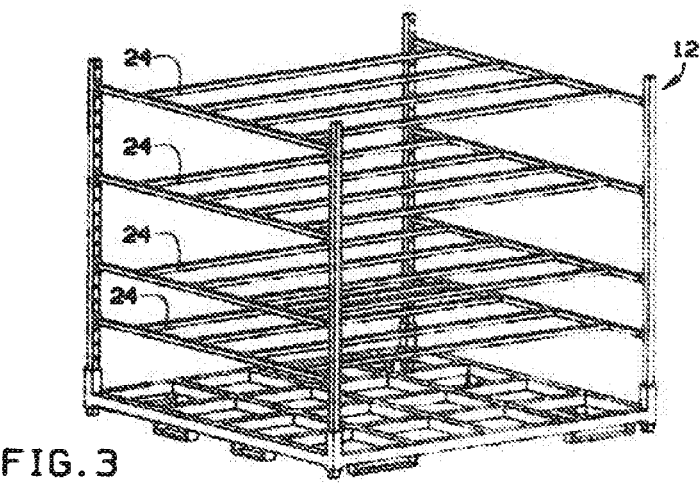
FIG. 3 is a perspective view of the cartridge of FIG. 2 illustrated without the trays for illustrative clarity.
Figure 4:
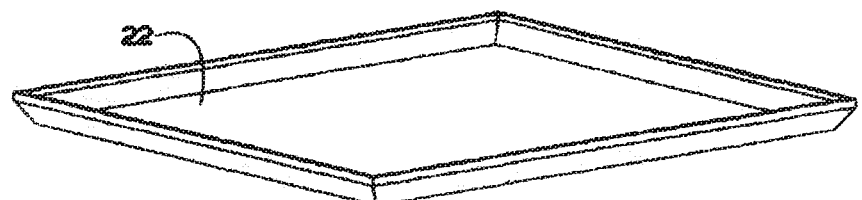
FIG. 4 is a perspective view of the tray of FIG. 2.

The shell 10 may contain the equipment of the present invention in a temperature controlled environment. The equipment may include, but is not limited to, trays 22, cartridges 12, light fixtures 26, and the like. The trays 22, may be containers that contain and facilitate the growth of plants. In certain embodiments, the cartridges 12 may be used to support the trays 22, as illustrated in FIG. 2. The cartridges 12 may be made of stainless steel and a water proof powder coating The cartridges 12 may include at least one rack 24. The cartridges 12 may be customized to size and consist of a series of levels of racks 24. In certain embodiments, each level may be adjusted vertically depending on plant height. In certain embodiments of the invention, the bottom of each level of racks 24 may support a lighting fixture 26. In certain embodiments, at the bottom of the cartridges 12 may be tracks 28 designed for forklifts and thereby may be easily removed from the shell 10 for planting, harvesting and maintenance purposes.

Figure 5:
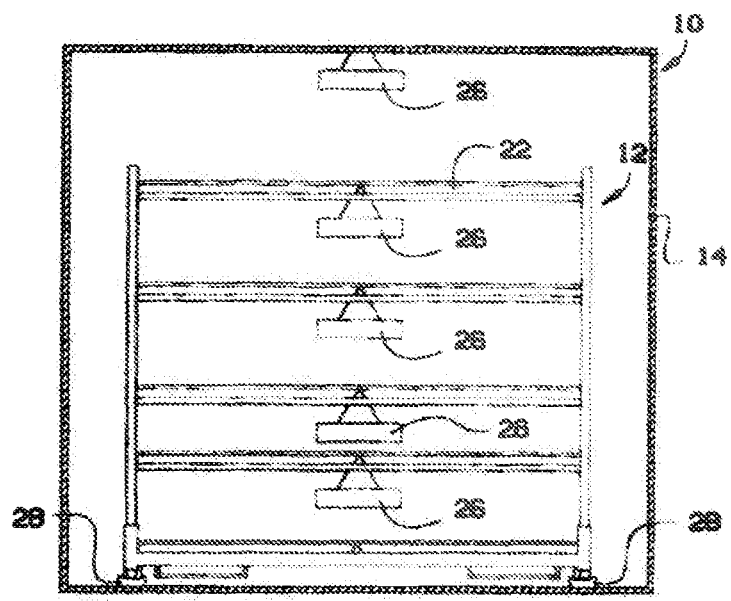
FIG. 5 is a sectional detail view of the present invention along line 5-5 in FIG. 1.

As mentioned above, the present invention may include lighting fixtures 26. The lighting fixtures 26 may be directed to supply light to the plants that are contained within the trays 22. For example, the lighting fixtures may hang over the trays 22. As illustrated in FIG. 5, the lighting fixture 26 may hang from an above rack 24 within the cartridges 12. The lighting fixture 26 may also hang from the top of the shell 10.

In certain embodiments, the lighting fixture 26 may include a combination of light emitting diodes (LED) and fluorescent lights mounted above the trays. The light fixtures may be turned on and off based on a preset time schedule. The LED lights may consist of blue and red spectrum. The fluorescent lights may be high intensity high output lights. The lights 26 may be interchangeable within a reflective hood system. The reflective hood may be attached above the lights to disburse light to cover a greater surface area. The hoods may be attached and detached from the cartridge system.

The shell 10 of the present invention may further include mechanisms for heating, cooling and ventilation (HVAC). The shell 10 may further include mechanisms that control humidity, pH levels, EC levels, CO2 levels, nutrient levels and water input. In certain embodiments, all of the mechanisms listed above and including the light fixtures 26 may be controlled by a digital central control system. Using the control system, the conditions within the shell 10 may be monitored from remote locations with the appropriate software. The control systems may further collect data to help improve and monitor farming practices.

Although the illustrations provide a vertical farming system, the present invention may also provide a shell and selected equipment for a single level growing system where efficiency of space is not a priority. Solar power, wind power and other forms of alternative energy may be added to run climate controlled mechanisms. Additional, aquaponic solutions may be integrated into our hydroponics systems to provide nutrients.

The following provides a method of making the device. First, the shell may be made by constructing a facility using SIP's panels and a medium weight steel frame. Then, the HVAC, electrical, ventilation, drainage and point of entry components made be installed. In addition, the hydroponics vertical cartridges may be made and inserted into the shell.

When complete the correct sensors and other control systems and mechanisms may be installed to finalize the turn key environment.

The following provides a method of using the device: placing at least one plant, nutrients and water into the at least one tray; placing the at least one tray onto the at least one cartridge; inserting the at least one cartridge into the shell through the at least one door; situating the light fixture over the plant; and controlling the climate within the shell.

The present invention may be used in food deserts. A food desert can be defined as an area that does not have farm land to produce crops or adverse temperatures that do not allow crop production. An example may include a highly populated city environment, a desert in Africa or on a ship. The present invention may provide a sustainable local food solution into communities in need. Consumers may use the farming facilities of the present invention in food deserts.

It should be understood, of course, that the foregoing relates to exemplary embodiments of the invention and that modifications may be made without departing from the spirit and scope of the invention as set forth in the following claims.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A housing having a controllable interior environment, said housing comprising:
   a shell having a plurality of walls including a front wall, a back wall, a top wall, a bottom wall, and first and second side walls;
   each of said walls each comprising at least one modular structural insulated panel, whereby said shell is modular with the number of panels used allowing the size of said shell to be fabricated to a desired scale;
   at least one of said walls including an insulated door;
   a cartridge sized for removable insertion within said shell through said door;
   said cartridge supporting a plurality of vertically spaced trays for containing plant matter;
   said plurality of vertically spaced trays being simultaneously removed from said shell upon removal of said cartridge; and
   a plurality of lights disposed within said shell and configured such that light is projected onto each of said trays.

2. A housing having a controllable interior environment, said housing comprising:
   a shell having a plurality of walls including a front wall, a back wall, a top wall, a bottom wall, and first and second side walls;
   each of said walls each including a plurality of modular structural insulated panels, whereby said shell is modular with the number of panels used allowing the size of said shell to be fabricated to a desired scale;
   at least one cartridge sized for removable insertion within said shell, said cartridge supporting a plurality of vertically spaced trays for containing plant matter;
   a plurality of lights disposed within said shell and configured such that light is projected onto each of said trays;
   at least one of said walls including an insulated door; and
   said plurality of vertically spaced trays being removed from said shell with the removal of said at least one cartridge.

3. A method of growing plants within a housing having a controllable interior environment, said method comprising:
   providing a shell having a plurality of walls including a front wall, a back wall, a top wall, a bottom wall, and first and second side walls, each of said walls each including a plurality of modular structural insulated panels;
   said shell including a door;
   providing at least one cartridge sized for removable insertion within said shell through said door, said cartridge supporting a plurality of vertically spaced trays, said vertically spaced trays being removable as a unit with removal of said at least one cartridge;
   placing at least one plant, nutrients, and water into each of said trays;
   said shell including a plurality of lights disposed therein and configured such that light is projected onto each of said trays;
   controlling the interior of said shell by maintaining air temperature and humidity within desired ranges.

* * * * *